United States Patent [19]

Shellenberger

[11] Patent Number: 4,960,102
[45] Date of Patent: Oct. 2, 1990

[54] FUEL-FIRED CONDENSING TYPE FORCED AIR HEATING FURNACE

[75] Inventor: Timothy J. Shellenberger, Fort Smith, Ark.

[73] Assignee: Rheem Manufacturing Company, New York, N.Y.

[21] Appl. No.: 475,181

[22] Filed: Feb. 5, 1990

[51] Int. Cl.$^5$ .............................................. F24H 3/02
[52] U.S. Cl. ............................. 126/110 R; 126/99 A; 126/116 R
[58] Field of Search ............. 126/110 R, 99 A, 116 R, 126/116 B

[56] References Cited

U.S. PATENT DOCUMENTS

| | | | |
|---|---|---|---|
| 2,379,017 | 6/1945 | McCollum | 126/110 B |
| 2,579,047 | 12/1951 | Luty | 126/110 R |
| 3,358,672 | 12/1967 | Dirk et al. | 126/110 R |
| 3,813,752 | 6/1974 | Bemrose et al. | |
| 4,182,303 | 1/1980 | Muckelrath | 126/110 |
| 4,298,061 | 11/1981 | Hoeffken | 165/170 |
| 4,478,158 | 10/1984 | Smith | 126/99 A |
| 4,557,249 | 12/1985 | Sweedyk | 126/110 R |
| 4,718,401 | 1/1988 | Delancey | 126/110 R |
| 4,718,484 | 1/1988 | Hoeffken | 165/170 |
| 4,794,908 | 1/1989 | Hall | 126/112 |

Primary Examiner—Carroll B. Dority
Attorney, Agent, or Firm—Hubbard, Thurman, Turner, Tucker & Harris

[57] ABSTRACT

A fuel-fired, condensing type forced air heating furnace is provided with an improved hot combustion gas-to-air heat exchange system which includes a generally drum-shaped primary heat exchanger having an outlet end connected to a first end of a transfer manifold whose second end is connected the inlet end of a fin-and-tube type secondary heat exchanger which is spaced laterally apart from, faces, and extends generally parallel to the primary heat exchanger. A radial discharge fuel burner end portion is coaxially positioned within an inlet end of the primary heat exchanger and, during furnace operation, a draft inducer fan draws burner combustion gases sequentially through the primary heat exchanger, the transfer manifold and the secondary heat exchanger while air to be heated is flowed externally over these heat transfer elements. The overall heating efficiency of the furnace is improved, and the fabrication cost of the furnace is reduced, by the use of the radial discharge burner, a perforated baffle wall which improves the air heating capacity of the manifold, and a weldless mechanical crimp roll joint construction used to fabricate and interconnect the primary heat exchanger and transfer manifold.

13 Claims, 3 Drawing Sheets

FUEL-FIRED CONDENSING TYPE FORCED AIR HEATING FURNACE

BACKGROUND OF THE INVENTION

The present invention relates generally to fuel-fired forced air heating furnace apparatus, and more particularly relates to a condensing type furnace having improved construction features and operating characteristics.

For many years, conventional fuel-fired forced air heating furnaces were (and still are) provided with a combustor and a single heat exchanger to transfer combustion product heat to the supply air being delivered to the conditioned space served by the furnace. The single heat exchanger, typically of the flat "clamshell" type, normally provides the furnace with an overall heating efficiency of approximately 70-75%, and generally removes a sensible heat portion of the total combustion product heat available. When heating fuel was relatively inexpensive, this was considered to be an acceptable heating efficiency even though a substantial portion of the available heat was sent up the flue in the form of hot exhaust gas.

With the dramatic escalation in heating fuel costs, however, vigorous design efforts were initiated to improve furnace heating efficiency. One method proposed was to additionally capture a portion of the latent heat of condensation of the combustion gases by adding to the system a secondary heat exchanger connected downstream of and in series with the primary heat exchanger. The secondary heat exchanger functions to partially condense the combustion gases discharged from the primary heat exchanger, thereby capturing a portion of the available combustion gas latent heat in addition to the sensible heat captured by the primary heat exchanger and transferred to the heating air. Furnaces utilizing this primary/secondary heat exchanger format are commonly referred to as "recuperative" or "condensing" furnaces.

While condensing furnaces of conventional construction and operation typically achieve a significant increase in overall heating efficiency compared to single heat exchanger furnaces, they typically have presented new problems and limitations which to a large extend have tended to offset their heating efficiency improvements For example, many conventional condensing furnaces are designed around "clamshell" type primary heat exchangers, a design which limits both the cost effectiveness and the feature set of the resulting condensing furnace.

Specifically, the cost effectiveness of conventional clamshell-designed condensing furnaces is typically limited by, among other things, the total number of parts required to fabricate the furnace, non-automated assembly techniques required to fabricate the heat exchanger portion of the furnace, the enlarged size of the resulting furnace, and the degree of obtainable thermal cooperation between the clamshell primary heat exchanger and its associated secondary heat exchanger.

Additionally, the feature set of conventional condensing furnaces utilizing clamshell type primary heat exchangers is typically limited by, among other things, the inability to obtain a totally sealed combustion system, a non-integral condensate drainage system, non-integral combustion air supply and venting connections, and the necessity of utilizing high excess air/lanced port burners.

In view of the foregoing, it is accordingly an object of the present invention to provide a condensing furnace which, compared to conventional condensing furnaces, has an improved construction and improved operating characteristics.

SUMMARY OF THE INVENTION

Various aspects of the present invention, by themselves and in combinations with one another, may be utilized to improve the construction and overall heating efficiency of a condensing furnace of the general type in which a draft inducer fan sequentially draws hot burner combustion gases through a primary heat exchanger, a transfer manifold connected at a first end thereof to the outlet end of the primary heat exchanger, and a secondary or "condensing" heat exchanger connected at its inlet end to a second end of the transfer manifold, while air to be heated is forced externally over the two heat exchangers and the transfer manifold. Set forth below are brief summaries of various features of the present invention. The sole purpose of the following summarization is to provide a general overview of the present invention, and is not to be construed as in any manner limiting its nature of scope.

According to one aspect of the invention, the primary heat exchanger of the condensing furnace has a hollow, drum-like configuration, and a specially designed fuel-air burner assembly is operatively mounted on the inlet end wall of the drum. The body of the burner assembly has a discharge end portion which projects axially into the inlet end of the drum, and has a tip section coaxially around which an annular array of generally radially facing fuel/air discharge ports are formed. The ignition of a fuel/air mixture discharged from these ports creates an annular flame pattern coaxially disposed within an inlet end portion of the drum. Compared to the flame issuing from a conventional axial discharge burner, this annular flame, together with the hot combustion gases which it creates, more efficiently transfers heat, along the entire length of the drum, to the heating air being flowed externally across the drum. Accordingly, the temperature of the combustion gases entering the transfer manifold from the primary heat exchanger is advantageously reduced.

According to another feature of the present invention, a circular baffle wall is secured to the discharge end of the primary heat exchanger adjacent its juncture with the first transfer manifold end. A spaced series of discharge openings is formed through a peripheral edge portion of the baffle wall closest to such first manifold end, but not through any part of the balance of the baffle wall. Accordingly, all of the hot combustion gases discharged from the primary heat exchanger into the transfer manifold are forced to internally traverse essentially the entire length of the transfer manifold, from its first end to its second end, without a substantial portion of the discharged combustion gases "short circuiting" the transfer manifold (i.e., internally traversing only a relatively small portion of its length) as is typical in condensing furnaces of conventional construction. This, in turn, advantageously causes an increased heat exchange rate between the transfer manifold and supply air externally traversing it to thereby desirably reduce the temperature of combustion gases entering and flowing through the secondary or "condensing" heat exchanger.

According to yet a further aspect of the present invention, the construction of and interconnection between the primary heat exchanger and the transfer manifold are improved utilizing a mechanical edge rolling juncture forming technique which permits the fabrication and interconnection of these heat exchange elements to be easily automated, while at the same time eliminating the leakage areas typically resulting when the joints therebetween are formed by welding.

In a preferred embodiment of the condensing furnace, in which the primary heat exchanger is generally drum-shaped, and the aforementioned baffle wall forms a discharge end of the drum, a peripheral inlet end edge portion of the drum body is mechanically rolled in an axial direction with a peripheral edge portion of the inlet end wall of the drum to sealingly connect the drum body to such wall.

The transfer manifold has an inner side wall with a circular opening formed therethrough. A circular edge portion of this wall, which borders the opening, is mechanically rolled with a discharge end peripheral edge portion of the drum body and a peripheral edge portion of the circular baffle wall to form an essentially leakproof, nonwelded joint line around the juncture between the primary heat exchanger drum and the transfer manifold. Finally, an outer peripheral edge portion of the inner manifold wall is mechanically rolled with a corresponding outer peripheral edge portion of an outer manifold wall to complete the transfer manifold.

In addition to their individual advantages, when operatively combined, these and other features of the present invention provide a condensing type furnace which is markedly superior to conventional condensing furnaces.

DETAILED DESCRIPTION

Figure 1:
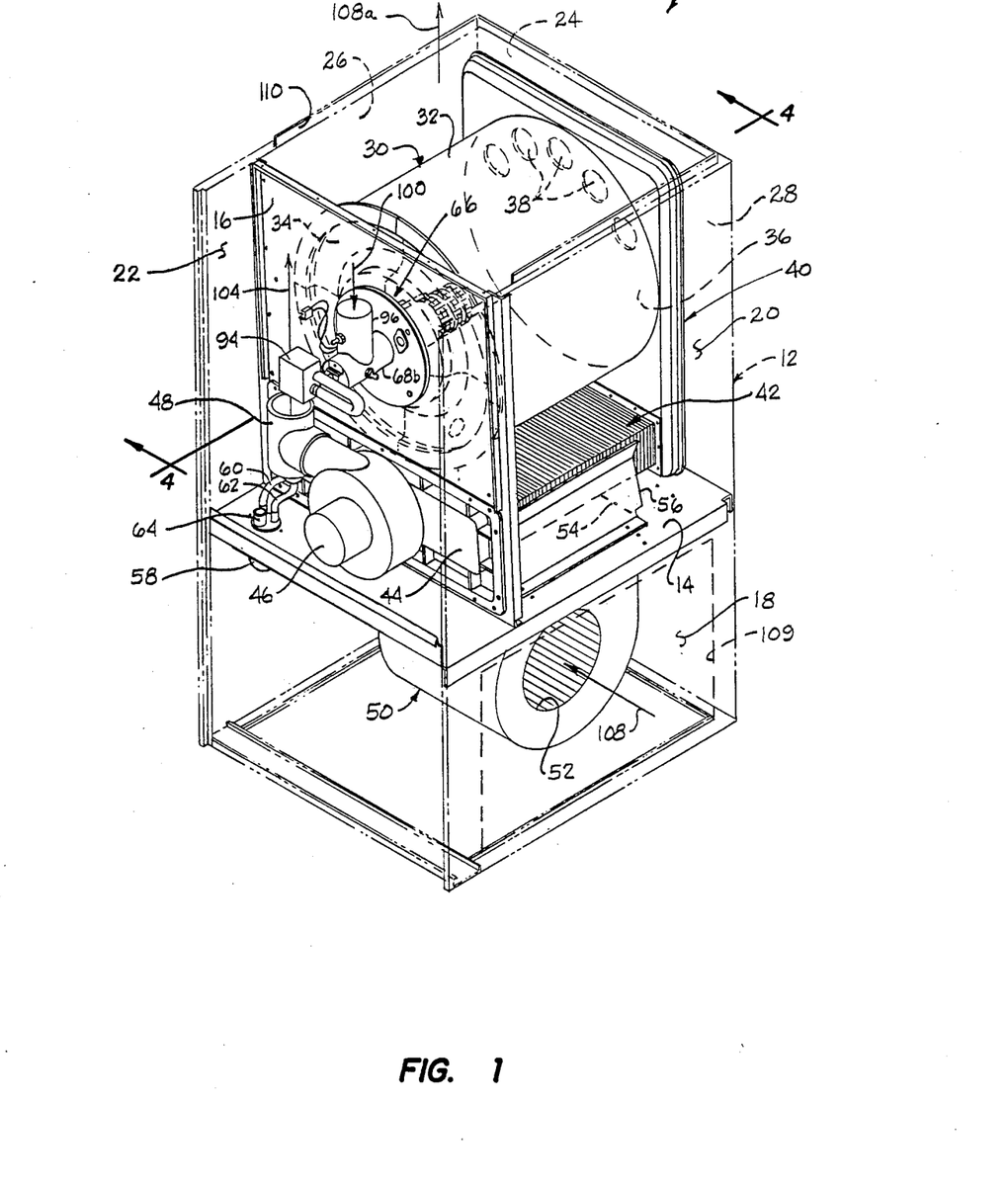
FIG. 1 is a front perspective view of a fuel-fired, condensing type forced air heating furnace which embodies principles of the present inventions, with various portions of the furnace housing being removed or shown in phantom for illustrative purposes.
Figure 2:
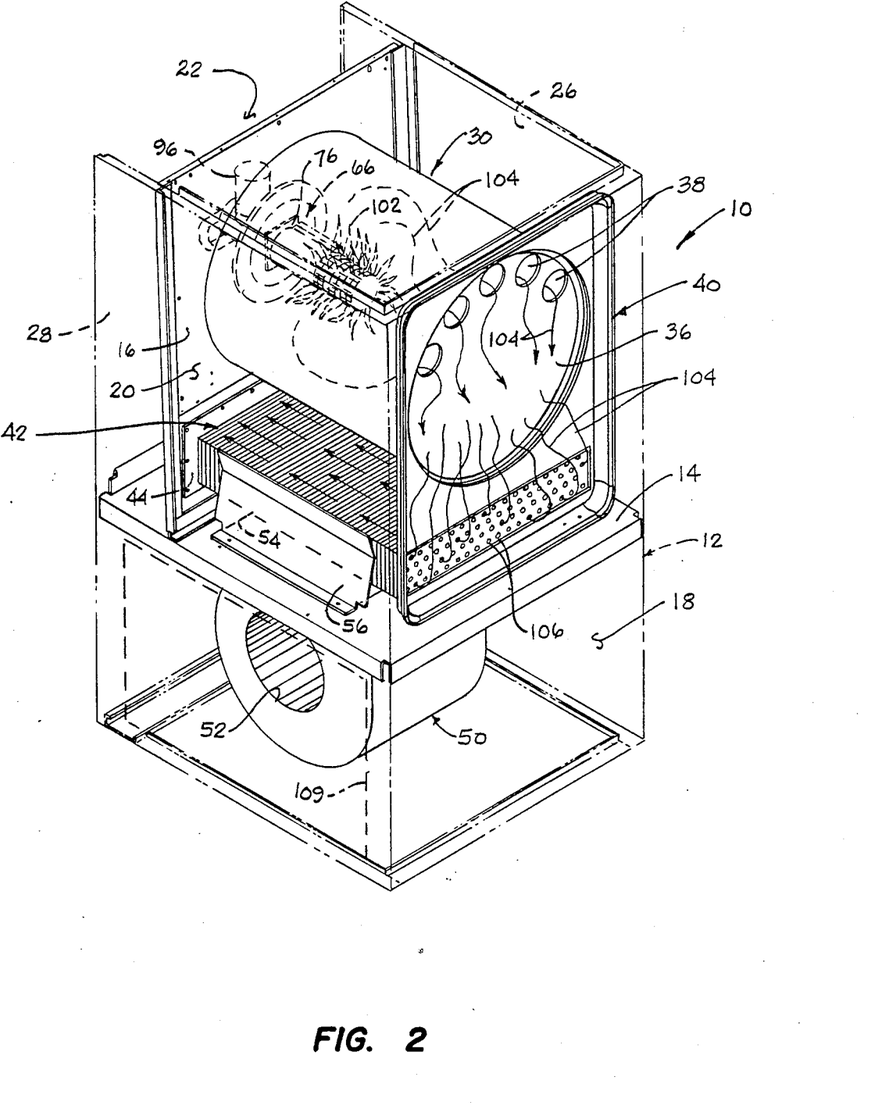
FIG. 2 is a rear perspective view of the furnace, with a rear side wall of its combustion product transfer manifold removed for illustrative purposes.

Perspectively illustrated in FIGS. 1 and 2 is a gas-fired condensing type forced air heating furnace 10 which embodies principles of the present invention. Furnace 10 includes a housing 12 which is illustrated in phantom, with portions removed therefrom, for illustrative clarity. A horizontal panel 14, and a vertical panel 16 extending upwardly therefrom, divide the interior of the housing 12 into a return air chamber 18 positioned at the bottom of the housing, and rear heating chamber 20 and a front access chamber 22 each positioned above the return air chamber 18. The furnace housing 12 has a front wall which has been removed for illustrative purposes, a vertically extending rear wall 24, and vertically extending opposite left and right side walls 26 and 28.

A horizontally disposed, generally drum-shaped primary heat exchanger or combustor 30 is positioned within an upper portion of the heating chamber 20 and longitudinally extends in a front-to-rear direction therein. The primary heat exchanger 30 has a hollow cylindrical body portion 32, a front end wall 34 positioned rearwardly adjacent the vertical divider panel 16, and a rear end baffle wall 36 spaced forwardly of the rear side wall 24 of the housing 12. For purposes later described the rear end baffle wall 36 has formed therethrough a circumferentially spaced series of discharge openings 38 which extend along only an upper peripheral portion of the baffle wall 36.

The rear end baffle wall 36 of the primary heat exchanger 30 is secured, in a manner later described, to an upper end portion of a vertically disposed, generally rectangularly shaped transfer manifold structure 40 positioned within the heating chamber 20 forwardly of the rear housing wall 24. A lower end portion of the transfer manifold 40 is connected to the rear or inlet end of a fin-and-tube type secondary heat exchanger 42 which has a rectangular configuration and is spaced downwardly apart from the primary heat exchanger 30. The secondary heat exchanger 42 has a left-to-right horizontal dimension just slightly larger than the diameter of the primary heat exchanger, and has a front or discharge end which is secured to and communicates with a collector box 44 operatively supported by a lower end portion of the vertical divider panel 16. For condensate drainage purposes as later described, the secondary heat exchanger 42 slopes slightly downwardly and forwardly from its connection to the transfer manifold 40.

A draft inducer fan 46 is positioned within a lower portion of the front access chamber 22 and has an inlet operatively connected to the front side of the collector box 44, and a cylindrical discharge fitting 48 which may be connected to a combustion product exhaust flue (not shown). In addition to the draft inducer fan 46, the furnace 10 is provided with a supply air blower 50 which is disposed within the return air chamber 18. The blower 50 has an inlet 52, and an outlet which is connected to a rectangular air inlet opening 54 formed through the horizontal divider panel 14 directly beneath the secondary heat exchanger 42. In a left-to-right direction, the inlet opening 54 is somewhat wider than the secondary heat exchanger 42, and is bordered on its left and right sides by upwardly projecting flow directing panels 56 (only one of which is visible in FIGS. 1 and 2) which slope upwardly and inwardly to the opposite left and right side edges of the secondary heat exchanger as illustrated.

For purposes later described, a condensate drain and trap assembly 58 is secured to the horizontal divider panel 14 and is operatively connected to the front outlet end of the secondary heat exchanger 42 by means of a drain conduit 60. The closed lower end of the draft inducer fan discharge fitting 48 is also connected to the condensate drain and trap assembly 58 by a conduit 62. The assembly 58 is provided with a condensate discharge fitting 64 which may be connected to a suitable main condensate drain (not shown) leading away from the furnace.

Figures 3, 3A, 4, 4A, 4B, 4C:
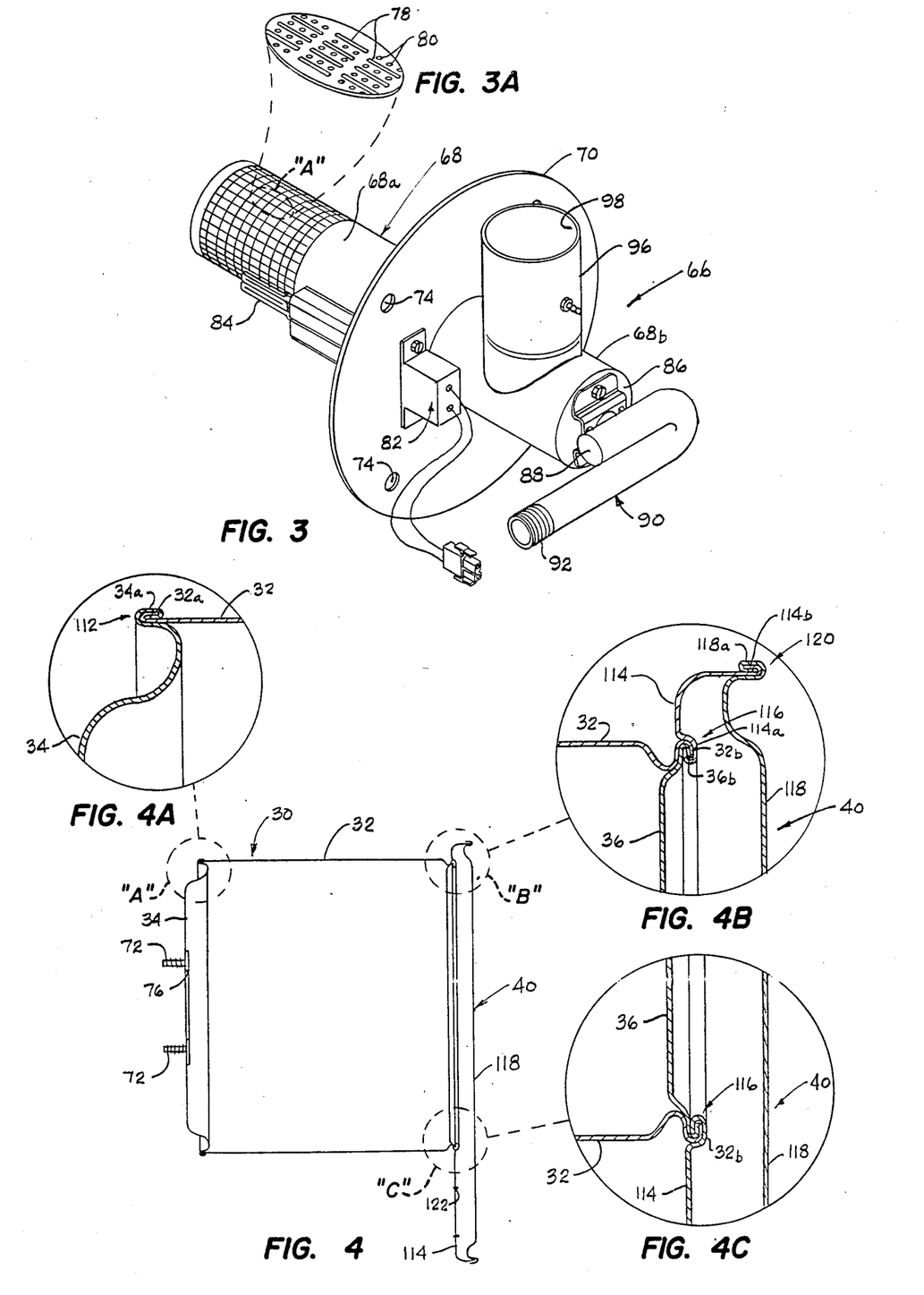
FIG. 3 is an enlarged scale perspective view of a burner assembly portion of the furnace.
FIG. 3A is an enlarged scale perspective view of the burner discharge section shown within the dashed line area "A" in FIG. 3.
FIG. 4 is an enlarged schematic cross-sectional view through combustor drum and transfer manifold portions of the furnace, taken along line 4—4 of FIG. 1, with the burner assembly removed from the combustor drum.
FIGS. 4A, 4B and 4C, respectively, are enlarged scale cross-sectional joint detail views of the areas within the dashed circles "A", "B" and "C" in FIG. 4.

As illustrated in FIGS. 1-3, the furnace 10 is also provided with a gas burner assembly 66 which includes an elongated, hollow tubular body portion 68 to a longitudinally intermediate portion of which an annular mounting plate 70 is coaxially secured. The mounting plate 70 is removably connected to the front side of the vertical divider panel 16 by means of an annular series of threaded studs 72 (FIG. 4) which are anchored to the front wall 34 of the primary heat exchanger 30 and extend through suitable openings in the divider panel 16, and aligned openings 74 in the mounting plate 70, and have retaining nuts (not illustrated) secured thereto on the front side of the retaining plate 70.

The burner body member 68 has a rear end portion 68a which extends through a suitable opening 76 passing through the divider panel 16 and the front end wall of the primary heat exchanger 30, and a front end portion 68b projecting into the front access chamber 22. The burner body portion 68a is coaxially disposed within a rear end interior portion of the primary heat exchanger 30, and has formed circumferentially around its outer end a spaced series of elongated gas discharge slots 78 and intervening circular gas discharge openings 80 as illustrated in FIG. 3A. A hot surface igniter assembly 82 is suitably secured to the mounting plate 70 and has an igniter portion 84 positioned within the heat exchanger laterally adjacent the ported discharge end portion of the burner body 68 as illustrated in FIG. 3.

The burner body portion 68b disposed within the front access chamber 22 has a gas inlet end 86 operatively connected to one end 88 of a curved, tubular gas supply manifold 90 whose threaded opposite end 92 is secured to a gas supply valve 94 disposed within the front access chamber 22 and operatively connected to a gas supply line (not illustrated). A tubular combustion air intake fitting 96, having an open upper end 98 connectable to an air intake conduit (not shown), is connected to the top side of the burner body portion 68b and communicates with its interior so that combustion air drawn into the intake fitting 96, as subsequently described, is mixed therein with gaseous fuel supplied to the gas inlet of the burner and delivered to the circumferentially ported discharge end of the burner disposed within the primary heat exchanger.

During operation of the furnace 10, the draft inducer fan 46 draws combustion air 100 into the burner body portion 68b through the combustion air intake fitting 96 for mixture within the body portion 68b with gaseous fuel received therein from the gas supply valve 94. The gas/air mixture flows outwardly through the burner ports 78, 80 and, after ignition of the mixture by the igniter 84, forms and annular, radially directed flame pattern 102 (FIG. 2) which is coaxially positioned within a rear end portion of the primary heat exchanger 30. The radially directed flame pattern 102 produces within the primary heat exchanger 30 hot combustion gases 104 which, by operation of the draft inducer fan, are drawn rearwardly through the baffle wall openings 38 into the interior of the vertical transfer manifold 40 as best illustrated in FIG. 2. Hot combustion gases 104 entering the transfer manifold flow downwardly therethrough and are drawn forwardly through the tubes 106 of the secondary heat exchanger 42 into the collector box 44. Finally, the combustion gases 104 are drawn into the inlet of the draft inducer fan 46 and discharged from the inducer fan into the exhaust flue (not shown) via the inducer fan discharge fitting 48.

While the combustion and heat exchange portions of the furnace 10 are operating in this manner, the supply air blower 50 draws conditioned space return air 108 into the return air plenum 18 through a suitable filtered opening 109 therein. Return air 108 entering the plenum 18 is drawn into the blower inlet 52 and forced upwardly through the divider panel air inlet opening 54 into the heating chamber 20. The air 108 is then forced upwardly through the heating chamber 20 across the secondary heat exchanger 42, the vertical transition manifold 40 and the primary heat exchanger 30, thereby converting the return air to heated supply air 108a. Finally, the heated supply air 108a is forced upwardly through a top end housing opening 110 and back to the conditioned spaced via a suitable supply ductwork structure (not shown) operatively connected to the housing discharge opening 110.

The temperature of any given volume of hot combustion gases 104 is progressively lowered as it sequentially passes through the primary heat exchanger 30, the vertical transition manifold 40, and the secondary heat exchanger 42 and successively transfers heat to the upwardly flowing supply air via these three components of the overall furnace combustion system. As these combustion gases enter and forwardly traverse the secondary heat exchanger 42, there temperature has been lowered to an extent sufficient such that the secondary heat exchanger 42 transfers latent heat of condensation from the combustion gases to the upwardly flowing supply air in addition to the sensible heat transferred thereto by the primary heat exchanger 30 and the vertical transition manifold 40. Accordingly, the reduced temperature combustion gases traversing the secondary heat exchanger partially condense therein, the resulting condensate being drained into the trap assembly 58 via the drain conduits 60 and 62. In this manner, both sensible and latent heat are withdrawn from the hot combustion gases, thereby substantially increasing the heating efficiency of the furnace 10 compared to a single heat exchanger, non-recuperative furnace.

This advantageous increase in the heating efficiency of the furnace 10 is further augmented by several unique structural and operational features thereof which will now be discussed. For example, as previously mentioned, the radial gas/air mixture discharge configuration of the ported burner body portion 68a (FIGS. 3 and 3A) produces the annular, radially directed flame pattern 102 (FIG. 2) which is coaxially disposed within a rear or inlet end of the primary heat exchanger 30. Compared to conventional axial discharge burners, this radial flame pattern positioned adjacent the inlet end of the drum-type primary heat exchanger 30, together with the hot combustion gases which it creates, produces a more even and complete heating of the interior drum surface along its entire length. Accordingly, an increased portion of the available heat from the combustion gases 104 is transferred to the upwardly flowing supply air 108a previously heated by the secondary heat exchanger 42. Because of this more efficient heat exchange from the primary heat exchanger 30 to the supply air, the temperature of the combustion gases 104 initially flowed into the vertical transition manifold 40 is desirably reduced, thereby correspondingly reducing the inlet gas temperature to the secondary heat exchanger which removes latent heat of condensation from the combustion gases.

Additionally, the positioning of the baffle discharge openings 38 only along an upper portion of the rear end baffle wall 36 of the primary heat exchanger 30 prevents the hot combustion gases 104 from "short circuiting" through the manifold 40 (i.e., passing through only a lower portion thereof), and instead causes all of the combustion gases 104 discharged into the manifold 40 to flow interiorly along essentially its entire vertical distance before entering the secondary heat exchanger 42. This creates a more efficient heat transfer from the hot combustion gases to the upwardly flowing supply air 108a through the manifold 40, thereby more effectively reducing the temperature of the combustion gases prior to their entry into the secondary heat exchanger.

The effect of the improved combustion gas-to-supply air heat exchange efficiency provided by the primary heat exchanger 30 and the associated vertical transfer manifold 40 is that the combustion gas entrance temperature at the secondary heat exchanger may be substantially reduced compared to recuperative or condensing type furnaces of conventional construction. In turn, this aspect of the present invention renders the construction of and materials used in the secondary heat exchanger considerably less critical. Specifically, one of the problems previously encountered in using a fin-and-tube type secondary heat exchanger in recuperative furnaces is the loss in heat exchange efficiency caused by greater thermal expansion of the fin portion thereof compared to the tube portion thereof. At the lower combustion gas inlet achieved in the present invention, this heat efficiency loss due to the differential in the thermal expansion rate of the fins compared to that of the tubes is substantially reduced.

Turning now to FIGS. 4–4C, the present invention also incorporates an improved construction of and interconnection between the primary heat exchanger 30 and the vertical transfer manifold 40. Specifically, instead of the conventional, leakprone welded construction and interconnection of these two heat exchange elements, which typically entails a considerable degree of manual labor, this construction and interconnection in the present invention is uniquely achieved using a mechanical edge rolling process which advantageously permits the construction and interconnection to be automated to provide important cost reductions and constructional improvements.

In constructing and interconnecting the primary heat exchanger 30 and the transfer manifold 40, a circular peripheral edge portion 34a of the front heat exchanger wall 34 (FIG. 4A) is mechanically rolled over onto a circular front end edge portion 32a of the annular heat exchanger body 32 and the edge portions 32a, 34a are then mechanically rolled rearwardly onto the exterior surface of body 32 to form an essentially air tight circular joint seal area 112 at the front end of the primary heat exchanger 30.

At the rear or right end of the primary heat exchanger 30 (FIGS. 4B and 4C), an inner edge portion 114a of the front wall 114 of the manifold 40, extending around a circular opening therein, is mechanically rolled around circular peripheral edge portions 32b, 36b of the heat exchanger body 32 and the baffle wall 36. The edge portions 32b, 36b and 114a are then mechanically rolled radially inwardly to form an essentially air tight circular joint seal area 116 at the juncture of the body 32, the baffle wall 36 and the front manifold wall 114.

In a similar fashion, an outer peripheral edge portion 118a of the rear manifold wall 118 (FIG. 4B) is mechanically rolled over an outer peripheral edge portion 114b, and the edge portions 114b 118a are then forwardly rolled onto the outer surface of wall 114 to form an essentially air tight circular joint seal area 120 at the juncture between the front and rear walls 114, 118 of the transfer manifold 40. Additionally, a suitable opening 122 (FIG. 4) is formed through a lower end portion of the front manifold wall 114 for receipt and sealing connection to the inlet end of the secondary heat exchanger 42.

In this manner, the fabrication of and interconnection between the primary heat exchanger 30 and the transfer manifold 40 may be easily automated, using conventional sheet rolling apparatus, to thereby reduce the overall fabrication cost of the furnace 10 and to facilitate the construction of an essentially completely sealed combustion system due to the elimination of various hand-welding steps previously required. This, in turn, further improves the overall heating efficiency of the condensing furnace 10.

It can be seen from the foregoing that the present invention provides a condensing furnace in which, compared to conventional furnaces of this general type, a variety of structural and operational improvements are incorporated while at the same time desirably reducing the furnace's overall fabrication cost.

The foregoing detailed description is to be clearly understood as being given by way of illustration and example only, the spirit and scope of the present invention being limited solely by the appended claims.

What is claimed is:

1. A fuel-fired, condensing type forced air heating furnace comprising:

a housing having a heating chamber with an air inlet opening and a supply air outlet opening, and a return chamber communicating with said heating chamber through said air inlet opening and having a return air intake opening;

a generally cylindrical primary heat exchanger extending along a central longitudinal axis and disposed within said heating chamber, said primary heat exchanger having a generally circular front inlet end wall and generally circular rear discharge end wall spaced apart from said front inlet end wall along said central longitudinal axis;

a transfer manifold disposed within said heating chamber and having a first end portion extending outwardly across and covering said rear discharge end wall of said primary heat exchanger, and a second end portion extending from said primary heat exchanger toward said return chamber in a direction generally transverse to said central longitudinal axis;

a condensing heat exchanger disposed within said heating chamber and positioned between said primary heat exchanger and said air inlet opening, said condensing heat exchanger having an inlet end operatively connected to said second end portion of said transfer manifold, and an outlet end, said rear discharge end wall of said primary heat exchanger having diametrically opposite first and second peripheral portions spaced apart in said transverse direction, said second peripheral portion being positioned between said first peripheral portion and said condensing heat exchanger;

fuel/air burner means for generating an annular, generally radially directed flame pattern coaxially disposed within an inlet end portion of said primary heat exchanger and for producing hot combustion gases within said inlet end portion of said primary heat exchanger;

discharge opening means, formed in only an upper half of said rear discharge end wall of said primary heat exchanger through only said first peripheral portion thereof, for flowing said hot combustion gases from the interior of said primary heat exchanger into said first end portion of said transfer manifold;

draft inducer fan means having an inlet operatively connected to said outlet end of said condensing heat exchanger, said draft inducer fan means being operative to draw said hot combustion gases sequentially through said primary heat exchanger discharge opening means, said transfer manifold and said condensing heat exchanger and then discharge the combustion gases; and supply blower means for sequentially flowing air to be heated into said return chamber through said return air intake opening, into said heating chamber through said air inlet opening, through said heating chamber and externally across said condensing heat exchanger, said transfer manifold and said primary heat exchanger, and outwardly through said supply air outlet opening, the positioning of said discharge opening means in only said first peripheral portion of said rear discharge end wall of said primary heat exchanger causing essentially all of the hot combustion gases discharged from said primary heat exchanger to flow in said transverse direction along generally the entire outer side surface area of said rear discharge end wall and through the entire length of said first end portion of said transfer manifold to thereby prevent short circuiting of the discharged combustion gases flowing from said primary heat exchanger to said condensing heat exchanger through said transfer manifold.

2. The furnace of claim 1 wherein:
said condensing heat exchanger is of a fin and tube construction.

3. The furnace of claim 1 wherein:
said fuel air burner means includes a hollow tubular fuel and air-receiving body portion axially extending centrally through said inlet end wall into said inlet end portion of said primary heat exchanger, said body portion having an inner discharge end circumferentially around which a series of fuel/air mixture discharge ports are formed.

4. A fuel-fired, condensing type forced air heating furnace comprising:
a housing having a heating chamber with an air inlet opening and a supply air outlet opening, and a return chamber communicating with said heating chamber through said air inlet opening and having a return air intake opening;
a primary heat exchanger having a generally drum-shaped configuration, extending along an axis and disposed within said heating chamber, said primary heat exchanger having a front inlet end wall and a rear discharge end wall spaced apart from said front inlet end wall along said axis;
a transfer manifold disposed within said heating chamber and having a first end portion operatively connected to said discharge end wall of said primary heat exchanger, and a second end portion extending from said primary heat exchanger toward said return chamber in a direction generally transverse to said axis;
a condensing heat exchanger disposed within said heating chamber and positioned between said primary heat exchanger and said air inlet opening, said condensing heat exchanger having an inlet end operatively connected to said second end portion of said transfer manifold, and an outlet end;
fuel/air burner means for generating an annular, generally radially directed flame pattern coaxially disposed within an inlet end portion of said primary heat exchanger and for producing hot combustion gases within said inlet end portion of said primary heat exchanger.

said fuel air burner means including a hollow tubular fuel and air-receiving body portion axially extending centrally through said inlet end wall into said inlet end portion of said primary heat exchanger, said body portion having an inner discharge end circumferentially around which a series of fuel/air mixture discharge ports are formed, said series of fuel air mixture discharge ports including a circumferentially spaced array of axially elongated discharge slots circumferentially interdigitated with a spaced array of generally circular discharge openings;

draft inducer fan means having an inlet operatively connected to said outlet end of said condensing heat exchanger, said draft inducer fan means being operative to draw said hot combustion gases sequentially through said primary heat exchanger, said transfer manifold and said condensing heat exchanger and then discharge the combustion gases; and supply blower means for sequentially flowing air to be heated into said return chamber through said return air intake opening, into said heating chamber through said air inlet opening, through said heating chamber and externally across said condensing heat exchanger, said transfer manifold and said primary heat exchanger, and outwardly through said supply air outlet opening.

5. The furnace of claim 3 wherein:
said body portion of said burner means further has a longitudinal portion which projects axially outwardly from said inlet end wall of said primary heat exchanger, said longitudinal portion having an outer end in which an inlet opening is formed for receiving fuel from a source thereof, said longitudinal portion further having an air inlet fitting connected transversely thereto for receiving combustion air for delivery into the interior of said body portion for mixture therein with fuel received thereby.

6. A fuel-fired, condensing type forced air heating furnace comprising:
a housing:
supply blower means for sequentially flowing air to be heated into, through and out of said housing;
heat exchanger means disposed within said housing, in the path of air flowed therethrough by said supply blower means, for receiving a throughflow of hot combustion gases and transferring combustion gas heat to air flowed through said housing by said supply blower means, said heat exchanger means including:

a metal primary heat exchanger having a hollow cylindrical body with an annular inlet end peripheral edge portion and an annular discharge end peripheral edge portion, and an inlet end wall with an annular edge portion, said annular inlet end peripheral edge portion of said body and said annular peripheral edge portion of said inlet end wall being mechanically rolled together to form a weldless, essentially air tight annular joint at the juncture of said body and said inlet end wall, a hollow metal transfer manifold having a first portion operatively secured to said annular discharge end peripheral edge portion of said primary heat exchanger, and a second portion projecting laterally outwardly from said primary heat exchanger and having an opening formed therein, said transfer manifold comprising an inner side wall having a circular opening formed therethrough and an outer peripheral edge portion, and an outer side wall having an outer peripheral edge portion, said annular discharge end peripheral edge portion of said primary heat exchanger being mechanically rolled together with an annular peripheral edge portion of said inner side wall extending immediately around said circular opening therein to form a weldless, essentially air tight annular joint around the juncture of said primary heat exchanger body and said inner side wall of said transfer manifold, and outer peripheral edge portions of said inner and outer transfer manifold side walls being mechanically rolled together to form a weldless, essentially air tight peripheral juncture between said inner and outer transfer manifold side walls, and a condensing heat exchanger having an inlet end sealingly connected to said inner transfer manifold side wall over said opening therein, and an outlet end, the interiors of said primary heat exchanger, said transfer manifold and said condensing heat exchanger defining a combustion product flow path through said heat exchanger means, said combustion product flow path being essentially air tight from said inlet end wall of said primary heat exchanger to said outlet end of said condensing heat exchanger;

fuel/air burner means for generating hot combustion gases within an inlet end portion of said primary heat exchanger; and draft inducer fan means for drawing said hot combustion gases sequentially through said primary heat exchanger, said transfer manifold and said condensing heat exchanger.

7. The furnace of claim 6 wherein:

said primary heat exchanger further includes a circular discharge end wall having at least one combustion gas discharge opening formed therethrough, said discharge end wall having an annular peripheral edge portion which is mechanically rolled together with said annular discharge end peripheral edge portion of said primary heat exchanger body and said annular peripheral edge portion of said inner transfer manifold side wall extending immediately around said circular opening therein.

8. A fuel-fired forced air heating furnace comprising:
a housing;

blower means for flowing air to be heated upwardly through said housing;

a heat exchanger structure positioned in the path of air flow through said housing, including:

a horizontally disposed primary heat exchanger having a hollow cylindrical body with front and rear end portions respectively secured to front and rear end walls, said rear end wall having combustion product discharge openings formed only through an upper portion thereof;

a vertically disposed transfer manifold for receiving hot combustion gases discharged from said primary heat exchanger, said transfer manifold having a generally flat configuration; a front side wall having an upper end portion secured to said rear end portion of said primary heat exchanger around the periphery of said rear end wall of said primary heat exchanger, and a lower end portion projecting downwardly from said rear end portion of said primary heat exchanger; and a rear side wall, and a condensing heat exchanger having an inlet end secured to said lower end portion of said transfer manifold, said condensing heat exchanger extending forwardly from said transfer manifold in a downwardly spaced relationship with said primary heat exchanger and having an outlet end;

burner means for creating an annular, generally radially directed flame pattern coaxially disposed within a front end portion of said primary heat exchanger and generating hot combustion gases therein; and draft inducer fan means connected to said outlet end of said condensing heat exchanger and operative to draw said hot combustion gases rearwardly through said primary heat exchanger, into said transfer manifold along essentially its entire vertical extent, forwardly through said condensing heat exchanger, and then discharge the combustion gases, the positioning of said discharge openings in only said upper portion of said rear end wall of said primary heat exchanger serving to prevent short circuiting of the hot combustion gases from said primary heat exchanger to said condensing heat exchanger through said transfer manifold, thereby increasing the thermal efficiency of said heat exchanger structure and desirably reducing the temperature of the combustion gases received by said condensing heat exchanger.

9. The furnace of claim 8 wherein:

said combustion product discharge openings are formed only through an upper peripheral edge portion of said rear end wall of said primary heat exchanger.

10. A fuel-fired forced air heating furnace comprising:
a housing;

blower means for flowing air to be heated upwardly through said housing;

a heat exchanger structure positioned in the path of air flow through said housing, including:

a horizontally disposed primary heat exchanger having a hollow cylindrical body with front and rear end portions respectively secured to front and rear end walls, said rear end wall having combustion produce discharge openings formed only through an upper portion thereof;

a vertically disposed transfer manifold having a generally flat configuration; a front side wall having an upper end portion secured to said rear end portion of said primary heat exchanger, and a lower end portion projecting downwardly therefrom; and a rear side wall, and a condensing heat exchanger having an inlet end secured to said lower end portion of said transfer manifold, said condensing heat exchanger extending forwardly from said transfer manifold in a downwardly spaced relationship with said primary heat exchanger and having an outlet end;

burner means for creating an annular, generally radially directed flame pattern coaxially disposed within a front end portion of said primary heat exchanger and generating hot combustion gases therein; and draft inducer fan means connected to said outlet end of said condensing heat exchanger and operative to draw said hot combustion gases rearwardly through said primary heat exchanger, into said transfer manifold through said discharge openings, downwardly through said transfer manifold along essentially its entire vertical extent, forwardly through said condensing heat exchanger, and then discharge the combustion gases, a peripheral front end edge portion of said primary heat exchanger and a peripheral edge portion of said front end wall being mechanically rolled together to form a weldless, essentially air tight circular joint line around the juncture of said front end wall and the front end of said body, said front side wall of said transfer manifold having an outer peripheral edge portion, and a circular opening formed through said upper end portion, a peripheral rear end edge portion of said body, a peripheral edge portion of said rear end wall, and a peripheral edge portion of said rear side wall being mechanically rolled together to form a weldless, essentially air tight circular joint line around the juncture between said primary heat exchanger and said transfer manifold, and said outer peripheral edge portion of said front side wall being mechanically rolled together with an outer peripheral edge portion of said rear side wall to form a weldless, essentially air tight joint line around the juncture between said front and rear side walls of said transfer manifold.

11. The furnace of claim 8 wherein:

said burner means include a hollow tubular burner body extending axially inwardly into said primary heat exchanger through a central portion of its front end wall and having a discharge end portion circumscribed by a series of fuel/air mixture discharge openings.

12. A fuel-fired forced air heating furnace comprising:

a housing;

blower means for flowing air to be heated upwardly through said housing;

a heat exchanger structure positioned in the path of air flow through said housing, including:

a horizontally disposed primary heat exchanger having a hollow cylindrical body with front and rear end portions respectively secured to front and rear end walls, said rear end wall having combustion product discharge openings formed only through an upper portion thereof;

a vertically disposed transfer manifold having a generally flat configuration; a front side wall having an upper end portion secured to said rear end portion of said primary heat exchanger, and blower end portion projecting downwardly therefrom; and a rear side wall, and a condensing heat exchanger having an inlet end secured to said lower end portion of said transfer manifold, said condensing heat exchanger extending forwardly from said transfer manifold in a downwardly spaced relationship with said primary heat exchanger and having an outlet end;

burner means for creating an annular, generally radially directed flame pattern coaxially disposed within a front end portion of said primary heat exchanger and generating hot combustion gases therein; and draft inducer fan means connected to said outlet end of said condensing heat exchanger and operative to draw said hot combustion gases rearwardly through said primary heat exchanger, into said transfer manifold through said discharge openings, downwardly through said transfer manifold along essentially its entire vertical extend, forwardly through said condensing heat exchanger, and then discharge the combustion gases, said burner means including a hollow tubular burner body extending axially inwardly into said primary heat exchanger through a central portion of its front end wall and having a discharge end portion circumscribed by a series of fuel/air mixture discharge openings, said fuel/air mixture discharge openings including a circumferentially spaced series of axially extending slots interdigitated with generally circular openings.

13. The furnace of claim 11 wherein:

said burner body has a longitudinal portion projecting outwardly from said front end wall of said primary heat exchanger, said longitudinal portion having a fuel inlet at its outer end, and a cylindrical combustion air inlet member transversely secured thereto.

* * * * *